US012562413B2

(12) United States Patent
Schneider et al.

(10) Patent No.: US 12,562,413 B2
(45) Date of Patent: Feb. 24, 2026

(54) BATTERY HOUSING, BATTERY AND METHOD FOR MANUFACTURING A BATTERY

(71) Applicant: HBPO GmbH, Lippstadt (DE)

(72) Inventors: Christian Schneider, Bad Lippspringe (DE); Reinhold Brückner, Herzebrock-Clarholz (DE)

(73) Assignee: HBPO GmbH, Lippstadt (DE)

( * ) Notice: Subject to any disclaimer, the term of this patent is extended or adjusted under 35 U.S.C. 154(b) by 560 days.

(21) Appl. No.: 17/987,111

(22) Filed: Nov. 15, 2022

(65) Prior Publication Data

US 2023/0155203 A1 May 18, 2023

(30) Foreign Application Priority Data

Nov. 16, 2021 (DE) .................... 10 2021 129 846.6

(51) Int. Cl.
*H01M 10/613* (2014.01)
*H01M 10/65* (2014.01)
(Continued)

(52) U.S. Cl.
CPC ......... *H01M 10/613* (2015.04); *H01M 10/65* (2015.04); *H01M 50/209* (2021.01);
(Continued)

(58) Field of Classification Search
CPC .. H01M 10/613; H01M 10/65; H01M 10/615; H01M 10/617; H01M 10/6554; H01M 10/6556; H01M 10/6566; H01M 10/6567; H01M 10/625; H01M 10/6557; H01M 50/209; H01M 50/224; H01M 50/227; H01M 50/231; H01M 50/271; H01M 50/207; H01M 50/244;
(Continued)

(56) References Cited

U.S. PATENT DOCUMENTS 8,383,260 B2 2/2013 Essinger et al.
2009/0305124 A1* 12/2009 Ahn ..................... H01M 10/659
429/120
(Continued)

FOREIGN PATENT DOCUMENTS

CN 212907846 U * 4/2021
CN 114270605 A * 4/2022 .......... H01M 50/233
(Continued)

OTHER PUBLICATIONS

Zhou et al. (CN 212907846 U, Machine translation) (Year: 2021).*
(Continued)

*Primary Examiner* — Joshua L Allen
(74) *Attorney, Agent, or Firm* — Christian S. Hans; Bret E. Field; Bozicevic, Field & Francis LLP

(57) ABSTRACT

The invention relates to a battery housing (1), in particular for a starter battery for a vehicle, having a housing interior (2) for an arrangement of a plurality of battery cells (3), and a housing unit (10) which at least partially surrounds the housing interior (2) and has a duct system (20) with a plurality of channels (21) for guiding a fluid for temperature control of the housing interior (2). Furthermore, the invention relates to a battery (4), as well as a method for manufacturing a battery (4).

18 Claims, 7 Drawing Sheets

Figure 1:
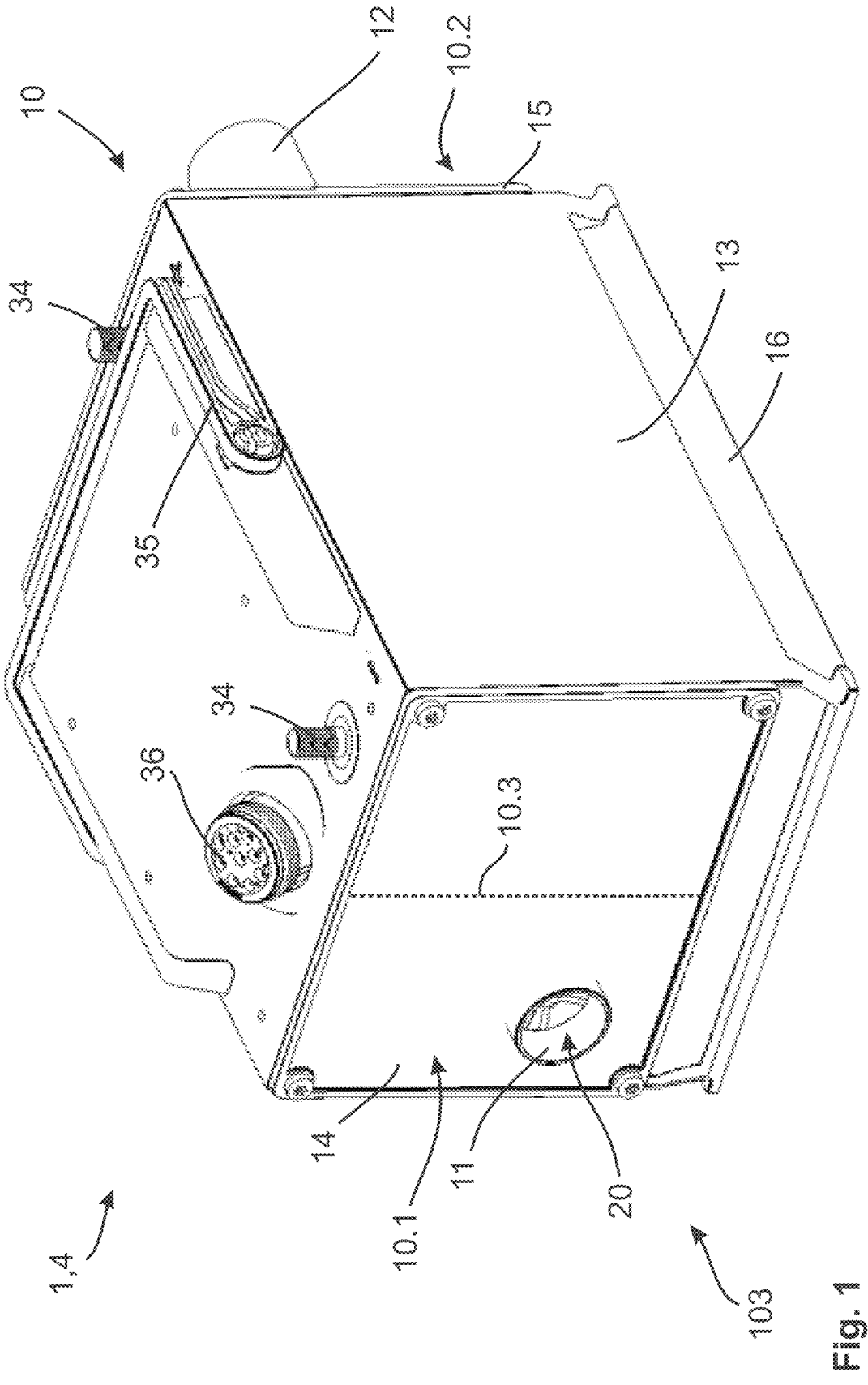

(51) Int. Cl.

| *H01M 50/209* | (2021.01) |
|---|---|
| *H01M 50/224* | (2021.01) |
| *H01M 50/227* | (2021.01) |
| *H01M 50/231* | (2021.01) |
| *H01M 50/271* | (2021.01) |

(52) U.S. Cl.

CPC ....... *H01M 50/224* (2021.01); *H01M 50/227* (2021.01); *H01M 50/231* (2021.01); *H01M 50/271* (2021.01)

(58) Field of Classification Search

CPC ............. H01M 50/256; H01M 50/287; H01M 50/291; H01M 50/30; H01M 50/20; H01M 50/64; H01M 50/204; H01M 2220/20; Y02E 60/10; B60L 50/64

See application file for complete search history.

(56) References Cited

U.S. PATENT DOCUMENTS

2011/0212355 A1* 9/2011 Essinger ........... H01M 10/6555
429/120

2011/0229749 A1* 9/2011 Kim .................... H01M 10/486
429/120
2013/0207459 A1* 8/2013 Schroder ............. H01M 50/264
307/10.1
2022/0344744 A1* 10/2022 Kim .................... H01M 10/613

FOREIGN PATENT DOCUMENTS

| CN | 221201301 U | * 6/2024 | |
|---|---|---|---|
| DE | 102011011650 A1 | 11/2011 | |
| DE | 102017114749 A1 | * 10/2018 | ......... H01M 50/224 |

OTHER PUBLICATIONS

Sluka et al. (DE 1020171147949 A1, machine translation). (Year: 2017).*

Office Action for German Application No. 102021129846.6 mailed on Aug. 9, 2022, with its English summary, 10 pages.

* cited by examiner

BATTERY HOUSING, BATTERY AND METHOD FOR MANUFACTURING A BATTERY

The invention relates to a battery housing, in particular for a starter battery for a vehicle, a battery, and a method of manufacturing a battery.

Housings for vehicle batteries are known from the state of the art in various configurations. However, especially with more advanced battery cell technologies, their cooling is becoming increasingly important. A distinction is made between passive cooling systems, which essentially rely on passive heat dissipation via an outer surface of the housing, and active cooling systems, in which a fluid such as water or air is pumped through the housing.

In order to guide the fluid during active cooling, it is known, for example, from DE 10 2017 127 807 A1 to integrate cooling channels parallel to each other in the housing to enable heat exchange between the housing interior and the fluid, which is guided through the cooling channels. To distribute the fluid to the channels, free spaces are provided on one housing side, to which the channels each have openings. Furthermore, the fluid is introduced centrally into the free spaces or discharged from the free spaces. Due to the different distances of the individual channels to the center, the flow can vary and/or lead to pressure differences, which in turn can cause turbulence. Furthermore, a complex structure of parallel lines is provided for communication with temperature control connections of the duct system.

It is an object of the present invention to at least partially eliminate the aforementioned disadvantages known from the prior art. In particular, it is an object of the present invention to improve a supply of a duct system for guiding a fluid in a battery with respect to the distribution of the fluid in the duct system, preferably with a stable and/or compact configuration.

The foregoing problem is solved by a battery housing having the features of the present disclosure, a battery having the features of the present disclosure, and a method having the features of the present disclosure. Further features and details of the invention result from the respective dependent claims, the description and the drawings. In this context, features and details described in connection with the battery housing according to the invention naturally also apply in connection with the battery according to the invention and/or the method according to the invention, and vice versa in each case, so that reference is or can always be made mutually with respect to the disclosure concerning the individual aspects of the invention, According to a first aspect of the invention, a battery housing is provided, in particular for a starter battery for a vehicle. The battery housing comprises a housing interior for an arrangement of a plurality of battery cells, in particular in the housing interior. Furthermore, the battery housing has a housing unit that at least partially or completely surrounds the housing interior and a duct system with a plurality of channels for guiding a fluid for temperature control of the housing interior. Thereby, the housing unit comprises at least a first housing side with a first fluid access point for external access to the duct system. It is further provided that the channels extend at least partially or completely along the first housing side in different directions and that the duct system comprises a guide structure for a common fluid communication of the channels with the first fluid access point.

The battery housing is configured in particular for a battery of a vehicle. In particular, the battery housing can comprise attachment intersections for fastening the battery in the vehicle. Furthermore, a handle unit can be provided for lifting the battery housing, which can enable convenient replacement of the battery, in particular the starter battery.

The housing interior can be configured as a cavity in the housing unit. The battery cells can be arranged individually or as a battery module in the housing interior. For this purpose, receiving areas, such as mounting regions for the battery cells, can be arranged in the housing interior.

The housing unit preferably forms a closed cover around the housing interior. However, it is equally conceivable that the housing unit is at least partially open to allow permanent access to the housing interior and/or the battery cells. The first housing side may comprise a flat or substantially flat surface. For example, the housing unit may be cuboidal and/or cube-shaped. However, it is equally conceivable that the housing unit comprises a curvature at the first housing side. For example, it is conceivable that the housing unit is formed in a pointed or hemispherical manner on the first housing side.

Temperature control of the housing interior can be understood as cooling and/or heating of the housing interior. The fluid can be a gas or a liquid for temperature control of the housing interior. In particular, the fluid may be a coolant. For example, the fluid may comprise water or air, or may consist of water or air.

The channels of the duct system may extend over several components of the housing unit, Preferably, the channels may have duct sections that extend at opposite sides of the housing interior. This can enlarge the area for heat exchange of the fluid with the housing interior.

In particular, the external access to the duct system may allow fluid inflow to the duct system and/or fluid outflow from the duct system of the housing unit. Thus, the external access may preferably include access from or to the outside of the battery housing. For example, the first fluid access point may allow the duct system to be connected to a cooling circuit of the vehicle and/or to an external pump of the vehicle. Advantageously, the first fluid access point can comprise a nozzle to which, for example, the cooling circuit or the external pump can be connected. Furthermore, it is conceivable that a drive, for example in the form of a pump, is integrated into the duct system, the first fluid access point and/or a second fluid access point.

The fact that the channels extend at least partially in different directions can be understood to mean that the channels are not parallel, in particular at least in sections on the first housing side. For example, individual channels of the duct system can lead in opposite directions and/or have an angle to each other. Thereby, the channels may be formed at least in sections to define a fluid flow in a plane in the different directions. Preferably, the channels are closed at the first housing side. Thus, it is conceivable that the channels are invisible when looking at the first housing side from the outside.

The guide structure is preferably arranged on the first housing side. By the common fluid communication of the channels, it can be understood that the channels, in particular all channels, can be supplied with the fluid via the first fluid access point and/or the fluid can be discharged from the channels via the first fluid access point. Thus, a central fluid communication for the channels can be provided. In this context, it may be provided that the channels on the guide structure are formed at least partially or completely open to at least one side, so that the guide structure acts partially conductive on one surface, but fluid communication between the channels is possible. Preferably, however, the channels on the first housing side are each closed circumferentially, so that fluid communication between the channels is possible on the first housing side only in the area of the first fluid access point.

The extension of the channels in different directions further results in the first fluid access point being able to serve as a central point for external access in a simple manner, while at the same time distributing the fluid to the channels. Thereby, the guide structure assists in particular to distribute the fluid flow to the channels in order to achieve a, preferably uniform, flow. For example, it is thereby possible to reduce or avoid pressure differences in the channels. Due to the at least partial extension of the channels on the first housing side, the fluid can advantageously be distributed centrally from the first fluid access point to the channels in order to obtain, in particular also in the region of the first housing side, a flow that is as laminar as possible. This also enables a compact configuration of the battery housing that is suitable for production.

Preferably, in a battery housing according to the invention, it can be provided that the guide structure is formed by restriction elements of the channels, in particular by a star-shaped course of the restriction elements. The restriction elements may in particular comprise channel walls of the channels. In this context, the restriction elements can extend perpendicular to the first housing side, for example. A channel cross-section of the channels may be defined by the restriction elements. In particular, each of the restriction elements can be configured to restrict two adjacent channels. In this way, the area available for the channels on the first housing side can he efficiently utilized in a compact configuration. By the star-shaped course of the restriction elements it can be understood that the restriction elements run radially towards a center or a point. The restriction elements can preferably have a linear and/or a curved course. It is conceivable that two restriction elements, which are opposite each other with respect to the center, extend in opposite directions. Through the restriction elements, the fluid flow can thus simultaneously define the channels and fulfil a guiding function of the guide structure for guiding the fluid flow from the first fluid access point.

Furthermore, in a battery housing according to the invention, it is conceivable that the guide structure has a distribution point at which the restriction elements converge on the first housing side, preferably two of the restriction elements in each case having an angle to one another at the distribution point, which angle forms a channel opening, especially wherein the angles for the locally different distribution of a fluid flow of the fluid differ at least partially. The angle may in particular at least partially define the star-shaped course. The channel opening may be aligned with the first fluid access point to allow fluid communication of the respective channel with the first fluid access point. Preferably, the channel openings are arranged circumferentially around the distribution point. It may be provided that the distribution point comprises a protrusion extending on the first housing side towards the first fluid access point and/or projecting into the first fluid access point. Thus, a shape of the distribution point may be aerodynamically and/or hydrodynamically advantageous to direct fluid flow. Thus, an advantageous distribution of flow elements from the first fluid access point to the channels can be achieved by the distribution point and the angle of the restriction elements, while maintaining a manufacturing-friendly and compact configuration.

It is further conceivable in a battery housing according to the invention that the housing unit comprises a middle part which extends from the first housing side and surrounds the housing interior, in particular circumferentially, preferably wherein the channels extend along at least one side, preferably along at least two opposite sides, of the middle part. The middle part may at least partially define the first housing side. Preferably, the restriction elements may be arranged on the middle part. The two sides of the middle part may be longitudinal sides of the housing unit extending, for example, between the first and second housing sides and/or perpendicular to the first and/or second housing sides. In particular, the channels may thus have a bend from the first housing side to the two sides of the middle part. In this regard, the restriction elements may be configured to direct fluid flow from the first fluid access point to channel sections extending along the two sides of the middle part. By extending the channels along the sides of the middle part, heat exchange of the fluid with the housing interior may be enhanced.

Within the scope of the invention, it is further conceivable that the housing unit comprises at least a second housing side with a second fluid access point for external access to the duct system, wherein the middle part is arranged between the first housing side and the second housing side, in particular wherein the channels extend at least partially along the second housing side in different directions and the duct system has a further guide structure for a common fluid communication of the channels with the second fluid access point. It is conceivable that the first and second housing sides are symmetrical to each other. Through the second fluid access point on the second housing side, the battery housing can thus be integrated into a conduit section of a temperature control system, in particular a cooling circuit. In particular, a flow of the fluid through the battery housing can thus be enabled. Preferably, the first fluid access point forms a fluid inlet for an entry of the fluid into the duct system and the second fluid access point forms a fluid outlet for an exit of the fluid from the duct system or vice versa. Due to the further guide structure on the second housing side, the advantages of the guide structure on the first housing side can be used for both housing sides.

Furthermore, in a battery housing according to the invention, it can advantageously be provided that the housing unit has a geometric mid-level which extends centrally from the first housing side to the second housing side, the first fluid access point and the second fluid access point being arranged on opposite sides of the mid-level. In particular, the geometric mid-level can be understood as a mathematical and/or virtual plane that divides the housing unit into two halves. Thus, both fluid access points can be arranged eccentrically to the mid-level on the opposite sides. Preferably, both fluid access points have an equal distance to the mid-level. As a result, the channels may each have the same or substantially the same length. For example, a channel extending along the first housing side over a first length may extend along the second housing side over a second length that is different from the first length, while another channel conversely extends along the first housing side over the second length and at the second housing side over the first length. By matching the lengths of the channels, preferably, i.e. in particular uniform, flow conditions can be created in the individual channels in a simple manner.

Preferably, in a battery housing according to the invention, it may be provided that the channels have a kink at the transition from the first housing side and/or the second housing side to the middle part. The kink may comprise, for example, a change in direction of the channels between two channel sections. Preferably, each of the channels has at least two channel sections that are perpendicular at the kink or are oriented essentially perpendicular to each other. This allows a change in direction of the channels to guide the fluid around the middle part while maintaining a compact configuration. The guide structure and the extension of the channels along the first and/or second housing side thereby enable an advantageous supply and/or discharge of the fluid to and/or from the kink, in particular without generating strong turbulences in the fluid flow, Preferably, in a battery housing according to the invention, it can be provided that the housing unit comprises a first cover element for at least partially or completely covering the channels on the first housing side and/or a second cover element for at least partially or completely covering the channels on the second housing side, in particular wherein the first fluid access point is integrated into the first cover element and/or the second fluid access point is integrated into the second cover element. The first cover element can seal the channels at the first housing side. The second cover element may seal the channels on the second housing side. For example, the first and/or second cover element may contact the restriction elements for sealing the channels, in particular over the entire surface. Furthermore, it is conceivable that the first fluid access point is integrated into the first cover element and/or the second fluid access point is integrated into the second cover element. For example, the first and/or second fluid access point can be configured as a nozzle, in particular integral, with the first and/or second cover element. The first and/or second cover element can thus provide an assembly- and production-friendly means/ elements of covering the channels along the first and/or second housing side in order to guide the fluid flow from the first and/or second fluid access point along the first and/or second housing side.

Within the scope of the invention, it is furthermore conceivable that the housing unit has a hood element for closing the housing interior, the hood element forming at least partially or completely the first housing side, the second housing side and/or the middle part. For closing the housing interior, the hood element can be placed on a core element of the housing unit, in particular in such a way that the core element is accommodated at least regionally in the hood element. It may be provided that the hood element is cuboidal in shape to at least partially form the first and second housing sides and the middle part. The hood element allows during assembly of the battery housing first access to the housing interior and subsequently closure of the housing interior.

Furthermore, in a battery housing according to the invention, it is conceivable that the housing unit has a hybrid component and/or the hood element is configured as a hybrid component. In the hybrid component, a first material component and a second material component are bonded to one another. For example, the hybrid component may be manufactured in a two-component plastic injection molding process. Preferably, the first and second material components differ at least in a thermal conductivity property and/or a strength property. The hybrid component can thus combine different thermal properties and/or strength properties of the first and second material components to realize advantageous heat exchange and/or advantageous stability of the battery housing.

It is further conceivable in a battery housing according to the invention that the first material component is a metal, in particular in the form of aluminum, and/or the second material component is a plastic, in particular one which is reinforced with carbon and/or glass fibers. Preferably, the second material component may comprise a polyamide (PA), a polypropylene (PP) and/or a polybutylene terephthalate (FBI). For improved strength, the plastic may have a glass fiber content of about 30%. The combination of plastic and metal may enable advantageous, multi-component manufacturing of the housing unit. For example, the second material component may be molded onto the first material component by a plastic injection molding process. It may be provided that the first material component has fastening openings for the second material component to be guided through the first material component. This may improve the mutual fastening of the material components. In particular, a lightweight construction can be achieved by using aluminum. Further, a metal has the advantage of high strength and high thermal conductivity. For example, a contact surface of the channels oriented toward the housing interior may have the first material component. Thus, an advantageous heat exchange of the fluid with the housing interior can be achieved. The plastic can prevent or reduce heat exchange at least subsequently of the housing unit.

This can, for example, reduce an external heat influence, e.g. of a vehicle engine, on the duct system.

Preferably, in a battery housing according to the invention, it can be provided that the guide structure or guide structures, in particular the restriction elements of the channels, on the first and/or second housing side is/are formed at least partially or completely by the second material component. As a result, the guide structure can be formed and/or fixed in a simple manner. In particular, a plastic injection molding can be used to advantageously achieve a particularly individual shape of the restriction elements. In this case, the first material component and the first and/or second cover element can form further restrictions of the channels, in particular so that a circumferentially sealed channel cross section of the channels is formed at least in sectionally along the first and/or second housing side.

Preferably, in a battery housing according to the invention, it can be provided that the first material component forms an inner shell for defining the housing interior and the second material component forms an outer shell for enclosing the inner shell at least sectionally. Preferably, the inner shell can be U-shaped to at least partially define the first and second housing sides as well as a portion, in particular an upper portion, of the middle part. The enclosure may in particular form an enclosure of the first material component on five sides. As a result, the hood element may have, for example, a circumferentially closed hood shape when the hood element is formed by the first and second material components. The inner shell can be used as a base for applying the outer shell during manufacturing.

Furthermore, in a battery housing according to the invention, it is conceivable that the housing unit has a core element, the hood element having an opening in which the core element is at least partially accommodated, in particular the hood element and the core element are attached to each other. Preferably, the core element is at least partially surrounded by the hood element. The core element may be configured as a base for the housing interior. For example, the battery cells may be arrangeable in the core element before the housing interior is closed by the hood element. The attachment of the core element and the hood element to each other can be understood to mean that the core element and the hood element are fastened directly to each other, Preferably, the hood element is attached to the core element in a materially, form-fittingly and/or force-fittingly manner.

For example, the core element and the hood element can be screwed together. In this way, high strength, in particular stability, can be achieved for the housing unit.

Furthermore, in a battery housing according to the invention, it can advantageously be provided that the core element comprises a metal, in particular aluminum, and/or is configured as a continuous casting. A metal can enable advantageous heat exchange of the housing interior with the duct system. Furthermore, this can ensure a high stability of the core element to protect the battery cells in the housing interior. A configuration made of aluminum can contribute to a lightweight construction of the battery housing.

Furthermore, in a battery housing according to the invention, it can advantageously be provided that each of the channels has at least one channel section which is at least partially or completely integrated into a wall of the core element, in particular integrally. For example, restriction elements of the channel sections may be formed by the core element. In particular, the restriction elements may be arranged on an outer surface of the core element. Further, a base surface of the channel sections may be formed by a wall of the core element for the housing interior. It may be provided that the hood element, in particular the inner shell of the hood element, forms a further wall of the channel sections to circumferentially close the channels. Thereby, the core element and the hood element can seal the channels to each other. The channel sections can extend, in particular linearly, along the middle part. In this way, an advantageous heat exchange of the duct system with the housing interior can be achieved.

Furthermore, in a battery housing according to the invention, it can advantageously be provided that the first material component of the hood element and/or the core element are formed in a U-shaped manner. The U-shaped configuration can in each case form a part of the housing interior. In particular, an attachment of the hood element to the core element may completely define and/or close the housing interior. Furthermore, the U-shaped formation may improve the strength of the housing unit, in particular also against shear forces. In order to achieve an improved assembly of the hood element, the core element can comprise leg elements that have a trapezoidal base.

Furthermore, in a battery housing according to the invention, it can advantageously be provided that the hood element has at least one terminal contact for external connection to the battery cells, a handle unit for transporting the battery housing and/or a vent valve for venting the housing interior. The terminal contacts may include an electrical connection to the battery cells. This may allow the battery to be connected to an on-board electrical system in the vehicle. For example, the handle unit may comprise a handle having two detent positions for an installed state and an assembled state. The handle unit may improve mobility and/or assembly of the battery housing in the vehicle. The vent valve may allow gases in the housing interior to be vented to the outside. Thus, a safety of the battery may be improved. Therefore, several functional components can be integrated in the hood element, which simplifies the assembly of the battery housing.

Preferably, a battery housing according to the invention can provide for a control unit for battery management to be integrated into the housing unit, in particular into the hood element. The hood element can, for example, comprise a cavity for integrating the control unit. In particular, another functional component may thus be integrated in the hood element to allow easy assembly. In particular, the hood element may be easy to handle when completing the battery. Further, the control unit may be protected within the housing unit.

According to another aspect of the invention, a battery, in particular a starter battery for a vehicle is provided. The battery comprises a plurality of battery cells and a battery housing according to the invention.

Thus, a battery according to the invention has the same advantages as have already been described in detail with reference to a battery housing according to the invention. It is conceivable that the battery is a traction battery for a high-voltage network of the vehicle. Preferably, however, the battery may be configured to supply power to a low-voltage network, in particular at 12 volts or 48 volts. If the battery is a starter battery, the battery may act to supply electrical components prior to engine start. Through the starter battery, for example, a starter motor of an internal combustion engine can be activated or a traction battery can be connected to a high-voltage network of an electric motor. In particular, the battery cells are arranged in a housing interior of the battery housing. Preferably, the battery has at least two terminal contacts for connection to an on-board network of the vehicle. The battery can in particular also be referred to as an accumulator.

According to a further aspect of the invention, a method for manufacturing a battery, in particular a battery according to the invention, is provided. The battery has a housing unit of a battery housing, which at least partially surrounds a housing interior and has a duct system with a plurality of channels for guiding a fluid for temperature control of the housing interior. The method comprises, in particular in the form of method steps/stages:

Providing a base body to define at least a portion of the housing interior and at least a first housing side of the housing unit, At least partially or completely producing channels of the duct system extending at least partially along the first housing side in different directions, and a guide structure of the duct system for a common fluid communication of the channels with a first fluid access point for an external access to the duct system, wherein the at least partially production of the channels and the guide structure is performed on the base body, Completing the battery by arranging a plurality of battery cells in the housing interior, in particular on a core element of the housing unit to at least partially define the housing interior and/or in the base body, by connecting channel sections of the channels, by arranging the first fluid access point on the guide structure, and by dosing the housing interior.

Thus, a method according to the invention has the same advantages as have already been described in detail with reference to a battery housing and/or battery according to the invention. The base body may comprise, for example, an inner shell of a hood element. It may be provided that, for arranging the battery cells in the housing interior, a core element of the housing unit is first provided to define a part of the housing interior. In this regard, the battery cells may be arranged in the core element. Subsequently, the housing interior can be dosed by the hood element of the housing unit. In particular, the core element and the hood element can be fastened to each other when closing the housing interior, preferably by a direct screw connection. The bolting may be performed from the first and/or a second housing side. When the channel sections are connected, the duct system can be completed.

It is further conceivable in a method according to the invention that the base body is formed by a first material component and the guide structure is formed by a second material component, the first and second material components being connected to one another by material bonding during production of the guide structure. In particular, the guide structure can be created by a two-component plastic injection molding process. This allows a hybrid component to be formed, in particular in the form of a hood element. Thus, the guide structure can be formed in a simple and cost-effective manner.

Within the scope of the invention, it is further conceivable that the base body is covered at least in sections by the second material component during production of the guide structure. In this way, a cover can be formed which shields the duct system from heat exchange with the outside and/or enables the channels to be restricted in a manner suitable for production. In particular, this can form a cuboid hood element for the housing unit.

Figure 2:
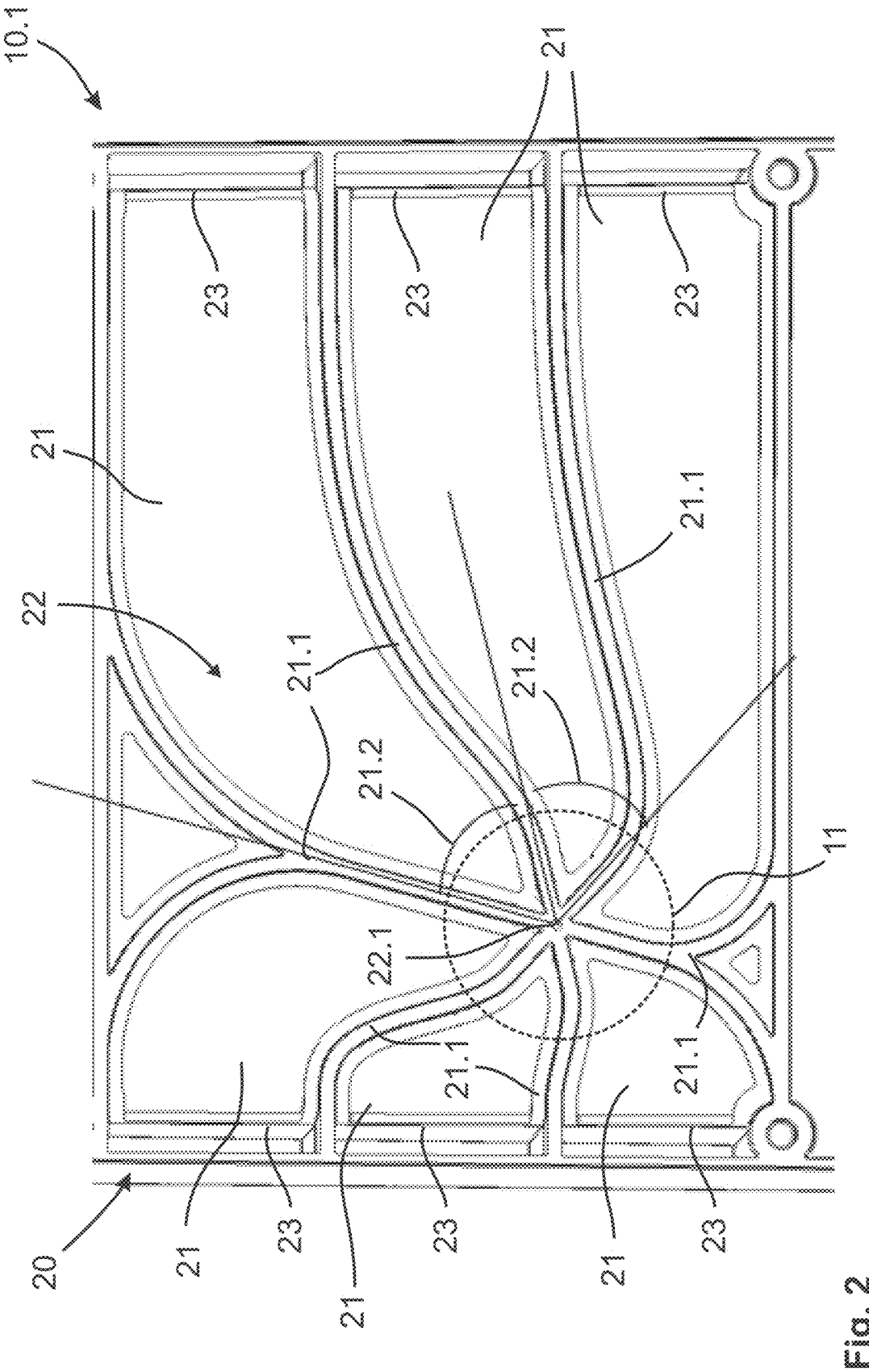
Figure 3:
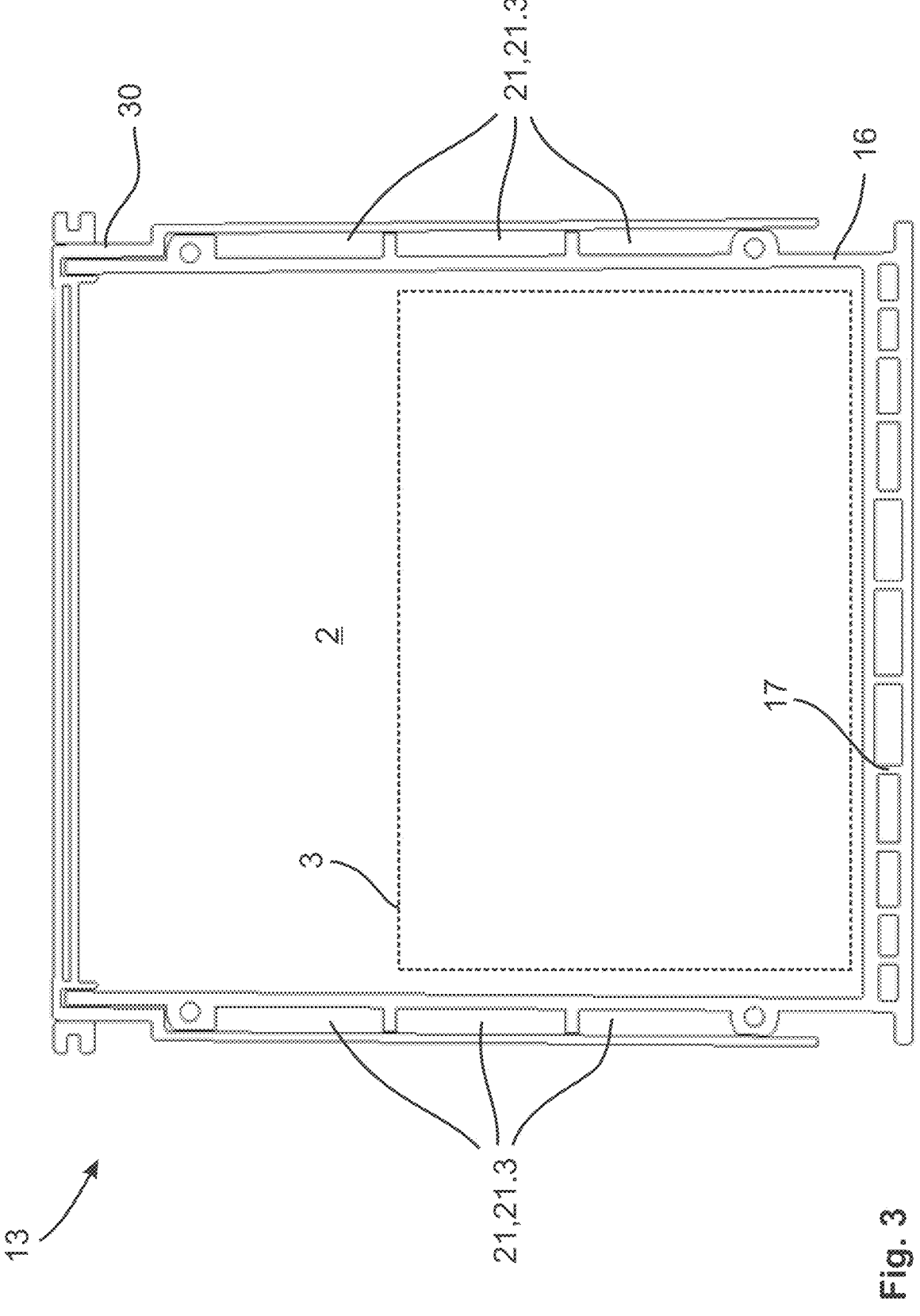
Figure 4:
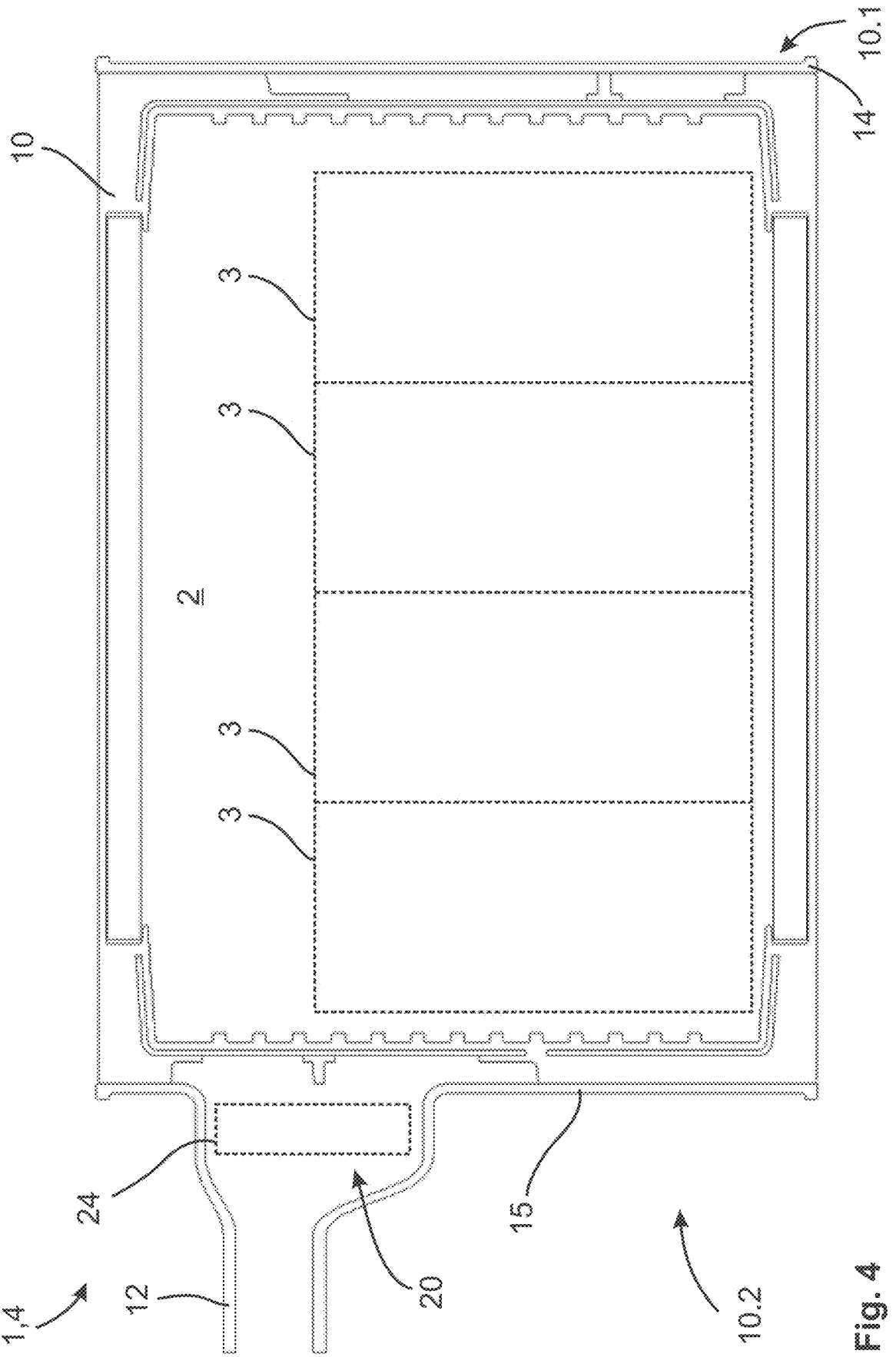
Figure 5:
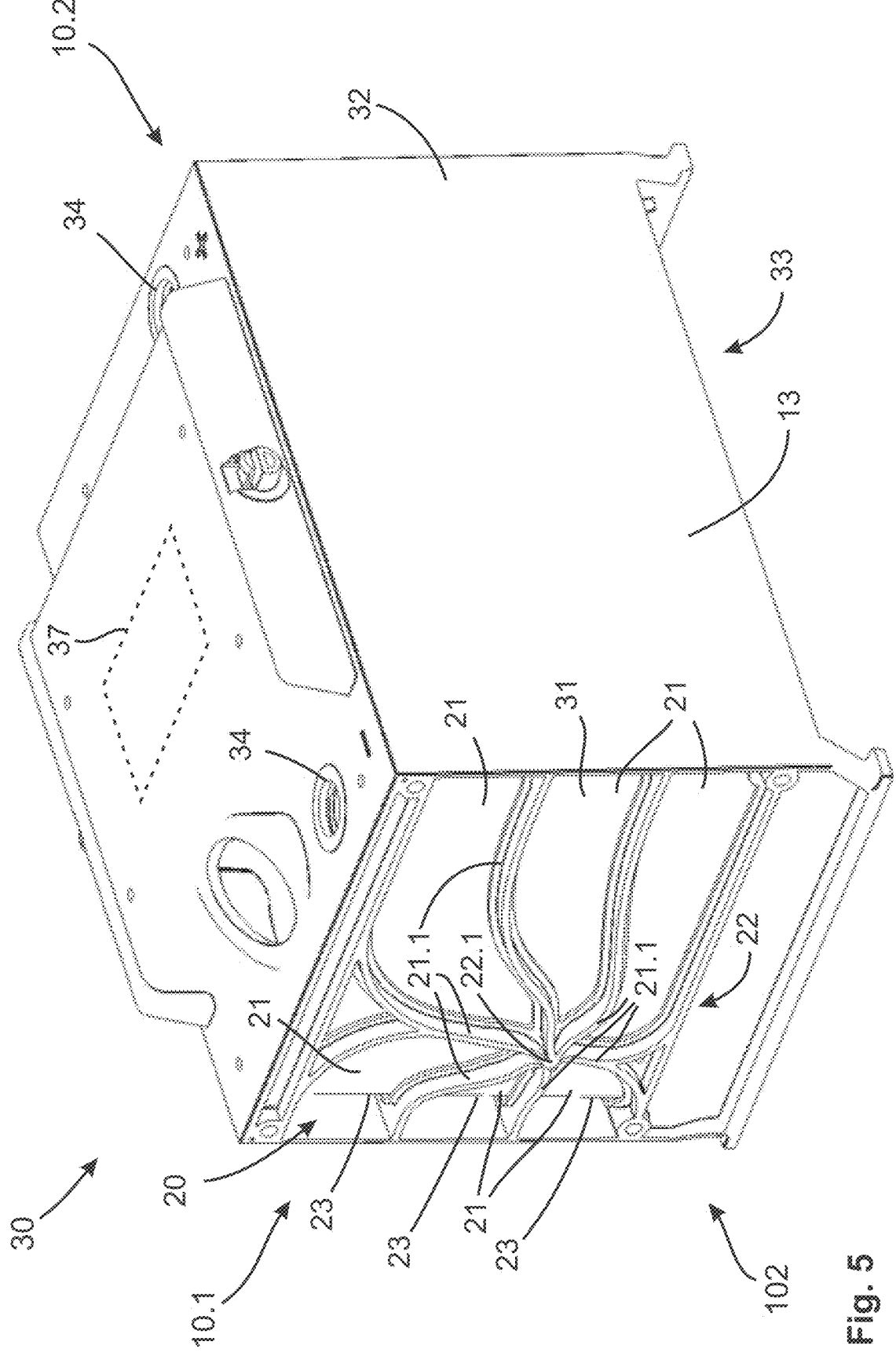
Figure 6:
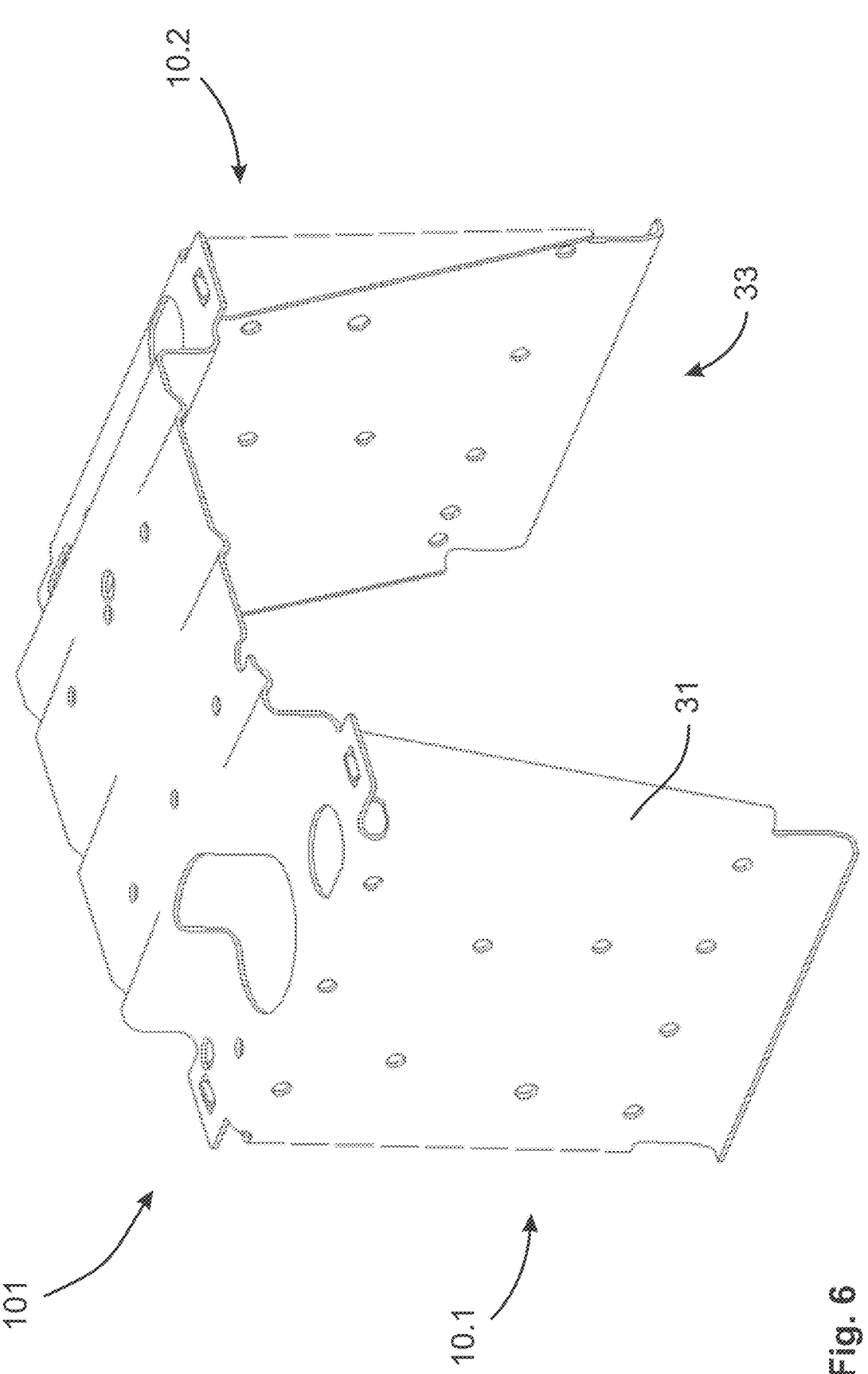
Figure 7:
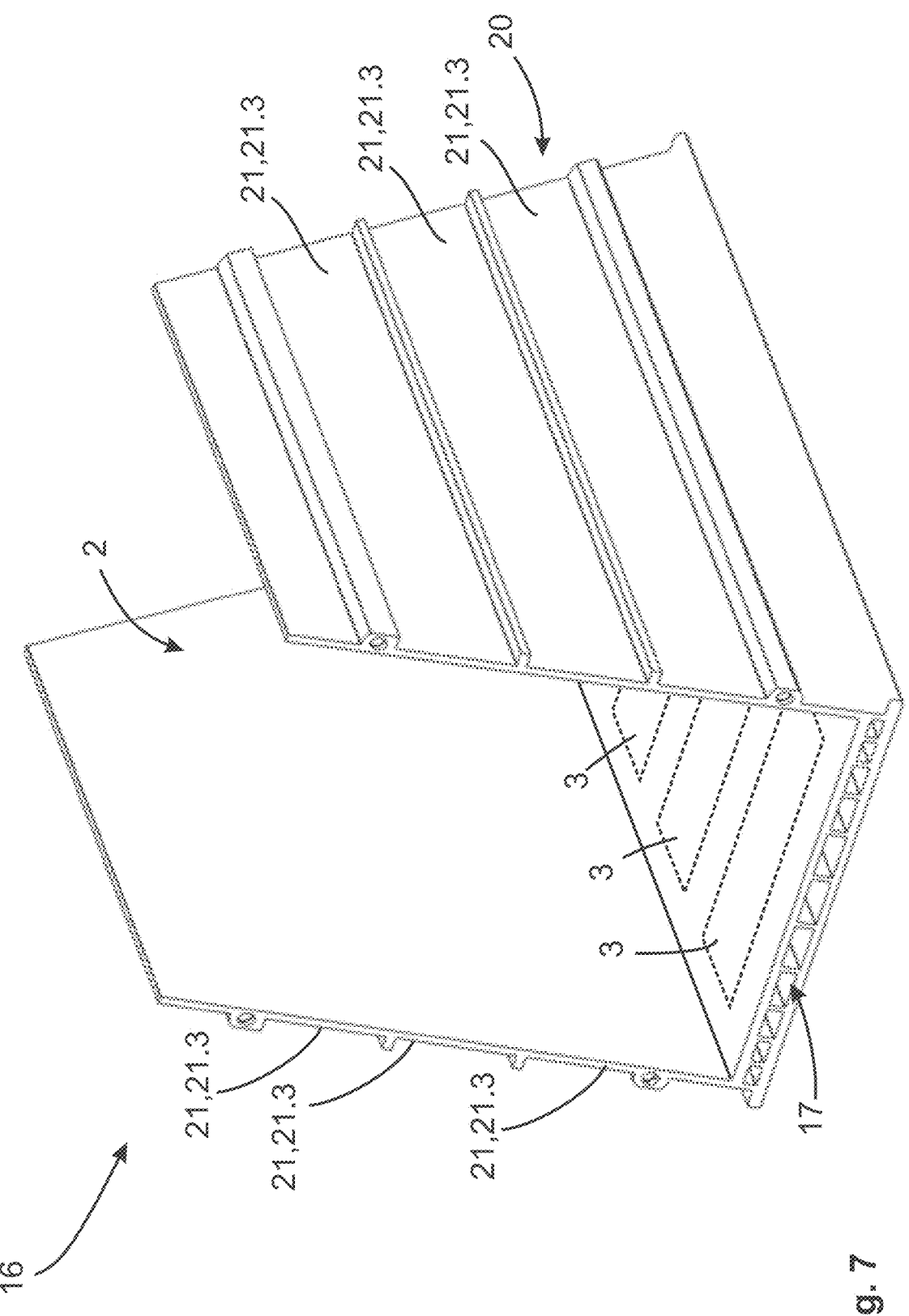

Further advantages, features and details of the invention will be apparent from the following description, in which embodiments of the invention are described in detail with reference to the drawings. In this connection, the features mentioned in the claims and in the description may each be essential to the invention individually or in any combination. It shows schematically:

FIG. 1 a battery according to the invention in a perspective view in a first embodiment, FIG. 2 a first housing side of a housing unit of a battery housing of the battery, FIG. 3 a middle part of the battery housing in a top view from the first housing side, FIG. 4 the battery housing in a cut side view, FIG. 5 a hood element of the battery housing with a first material component and a second material component, FIG. 6 the first material component of the hood element, and FIG. 7 a core element of a battery housing of the battery according to the invention.

In the following description of some embodiments of the invention, the identical reference signs are used for the same technical features even in different embodiments.

FIG. 1 shows a battery 4 according to the invention for a vehicle, in particular in the form of a starter battery for the vehicle in perspective view. The battery 4 has a battery housing 1 according to the invention with a housing interior 2 in which a plurality of battery cells 3 are arranged.

The battery housing 1 comprises a housing unit 10, which at least partially surrounds the housing interior 2, and a duct system 20 with a plurality of channels 21, which are configured to guide a fluid for temperature control of the housing interior 2. The fluid may be air or water, for example. For temperature control, the fluid can flow through the duct system 20, whereby a heat exchange with the housing interior 2 takes place. As a result, the battery cells 3 can be cooled or heated, in particular indirectly.

For external access to the duct system 20, the housing unit 10 has at least a first housing side 10.1 with a first fluid access point 11. Via the first fluid access point 11, the duct system 20 can, for example, be connected to a cooling system, in particular a cooling circuit, of the vehicle. Furthermore, the housing unit 10 has at least a second housing side 10.2 with a second fluid access point 12 for external access to the duct system 20. This enables the duct system 20 to be integrated into a line section of the cooling system and flowed through by the fluid. For example, the fluid may enter the duct system 20 at the first fluid access point 11 and exit the duct system 20 at the second fluid access point 12, or vice versa. As shown in FIG. 1, the housing unit 10 comprises a first cover element 14 for at least partially covering the channels 21 at the first housing side 10.1 and a second cover element 15 for at least partially covering the channels 21 at the second housing side 10.2. Preferably, the first fluid access point 11 is integrated into the first cover element 14 and the second fluid access point 12 is integrated into the second cover element 15. For the flow of the fluid through the duct system 20, a drive 24, e.g. in the form of a pump, can be integrated into the duct system 20, the first fluid access point and/or the second fluid access point, as shown in FIG. 4.

For the flow of the fluid, the housing unit 10 has a middle part 13 which extends between the first housing side 10.1 and the second housing side 10.2 and surrounds the housing interior 2 circumferentially. Furthermore, as shown in FIG. 3 in the top view of the middle part 13 from the first housing side 10.1, the channels 21 of the duct system 20 extend along at least one side, preferably along at least two opposite sides, of the middle part 13 from the first housing side 10.1 to the second housing side 10.2 and/or vice versa.

Furthermore, as shown in FIG. 2, the channels 21 extend at least partially along the first housing side 10.1 in different directions. As a result, the first fluid access point 11 can, for example, be configured in a tube-like manner, in particular as a nozzle, in order to allow the fluid to enter the duct system 20 in a certain area on the first housing side 10.1. For this purpose, the duct system 20 further comprises a guide structure 22 for a common fluid communication of the channels 21 with the first fluid access point 11. The guide structure 22 is thereby formed by a star-shaped course of restriction elements 21.1. In particular, the restriction elements 21.1 converge at a distribution point 22.1 of the guide structure 22. The distribution point 22.1 may, for example, have an aerodynamic or hydrodynamic shape to further improve the guidance of the fluid flow. At the distribution point 22.1, each two of the restriction elements 21.1 have an angle 21.2 with respect to each other, thereby forming a respective channel opening to the first fluid access point 11. An angular dimension of the angle 21.2 can further be used to generate different flow conditions in the channels 21 and/or to apply different volume flows of the fluid to the channels 21 in each case. For locally different distribution of the fluid flow, the angles 21.2, in particular the angular dimensions, can differ at least partially. Preferably, the first cover element 14 and the second cover element 15 each rest on the restriction elements 21.1 in order to pressurize the channels 21 at the first housing side 10.1 and the second housing side 10.2, in particular outside the first fluid access point 11 and the second fluid access point 12.

In particular, the channels 21 further extend at least partially along the second housing side 10.2 in different directions. For this purpose, the duct system 20 preferably comprises a further guide structure 22 for a common fluid communication of the channels 21 with the second fluid access point 12. The further guide structure 22 can, for example, be formed analogously to FIG. 2 from the viewpoint of the second housing side 10.2. In this case, the housing unit 10 has, in particular, a geometric mid-level 10.3 which extends centrally from the first housing side 10.1 to the second housing side 10.2. The mid-level 10.3 is shown in FIG. 1 as a mathematical plane in cross-section. When both the guide structure 22 of the first housing side 10.1 and the further guide structure 22 of the second housing side 10.2 are formed according to the top view shown in FIG. 2, the first fluid access point 11 and the second fluid access point 12 are arranged on opposite sides of the mid-level 10.3, This allows the channels 21 from the first fluid access point 11 to the second fluid access point 12 to have the same or substantially the same length, even though the channels 21 on the first housing side 10.1 and on the second housing side 10.2 each run asymmetrically.

By the course of the channels 21 along the first housing side 10.1 and the second housing side 10.2, an advantageous flow around the housing interior 2 can be achieved. Furthermore, however, this can also enable an advantageous inlet and/or outlet of the fluid between the first fluid access point 11 and/or the second fluid access point 12 and channel sections 21.3 extending along the two sides of the middle part 13. At the transition from the first housing side 10.1 and/or the second housing side 10.2 to the middle part 13, the channels 21 thereby have a kink 23.

It is further provided that the housing unit 10 comprises a core element 16 as shown in FIG. 7. The core element 16 preferably comprises a metal, in particular aluminum. Additionally or alternatively, the core element 16 may advantageously be in the form of a continuous casting. To form the channels 21 on the sides of the middle part 13, each of the channels 21 has at least one channel section 21.3 which is integrated, in particular integrally, into a wall of the core element 16. In particular, the core element 16 further forms at least one inner surface of the housing interior 2. Due to the metal configuration, the housing unit 10 in the area of the core element can have a high strength. In addition, this can provide a high thermal conductivity, which facilitate heat exchange between the channels 21 and the housing interior 2. It may further be provided that the core element 16 comprises a cooling structure 17, which may be formed separately from the duct system 20. The cooling structure 17 can be formed, for example, on a base plate of the core element 16 for locally improved heat conduction.

For closing the housing interior 2, which is at least partially defined by the core element 16, the housing unit 10 further comprises a hood element 30, which is shown in FIG. 5. The hood element 30 at least partially forms the first housing side 10.1, the second housing side 10.2 and/or the middle part 13. The hood element 30 is formed as a hybrid component, in which a first material component 31 and a second material component 32 are materially bonded to one another. The first material component 31 forms an inner shell for restricting the housing interior 2 and is shown in FIG. 6. The second material component 32 forms an outer shell for enclosing the inner shell at least sectionally. As shown in FIG. 5, the second material component 32 may surround the first material component 31 on five sides to create a cuboid structure. In this regard, the hood element 30 has an opening 33 in which the core element 16 is at least partially received when the battery housing 1 is assembled. Preferably, the hood element 30 and the core element 16 are fastened to each other during assembly, in particular by screwing. For advantageous assembly and high strength, the first material component 31 of the hood element 30 and the core element 16 are formed in particular in a U-shaped manner, so that the hood element 30 and the core element 16 correspond to each other.

The first material component 31 is preferably a metal, in particular in the form of aluminum. This can provide high strength and advantageous heat conduction to the housing interior 2, analogously to the core element 16. Preferably, the first housing side 10.1 and the second housing side 10.2 are configured at an inner side of the housing interior 2 through the first material component 31. The second material component 32 is preferably a plastic, in particular one reinforced with glass fibers. For example, the first material component 31 can be overmolded with the plastic for manufacturing the battery 4.

As a result, the guide structure 22 on the first and/or second housing side 10.2 can also advantageously be formed at least partially by the second material component 32. For example, the restriction elements 21.1 of the channels 21 on the first housing side 10.1 and on the second housing side 10.2 can be produced by injecting the second material component 32 onto the first material component 31, In this way, a curved shape advantageous for fluid flow can be produced in a simple manner.

For the manufacture of the battery 4 a provision 101 of a base body 31 in the form of the first material component 31 and/or the inner shell for defining at least a section of the housing interior 2 and the first housing side 10.1 and the second housing side 10.2 can be provided in a simple manner. Thereupon, an at least partial production 102 of the channels 21 and the guide structure 22 of the duct system 20 may be performed on the base body 31. Subsequently, a finishing 103 of the battery 4 can be performed by arranging the battery cells 3 in the housing interior 2, for example in the core element 16 or under the hood element 30, connecting channel sections 21.3 of the channels 21, arranging the first fluid access point 11 and the second fluid access point 12 to the guide structure 22 and closing the housing interior 2. For connecting the channel sections 21.3 and simultaneously closing the housing interior 2, for example, a fastening of the hood element 30 to the core element 16 can be carried out. Furthermore, the first fluid access point 11 and the second fluid access point 12 can be connected to the duct system 20 by arranging the first cover element 14 and the second cover element 15 on the first housing side 10.1 and the second housing side 10.2, respectively.

Furthermore, in order to keep the complexity of as many individual parts of the battery housing 1 as low as possible, different functions can be integrated into the hood element 30. Advantageously, the hood element 30 has at least one terminal contact 34 for an external connection to the battery cells 3, a handle unit 35 for transporting the battery housing 1 and a vent valve 36 for venting the housing interior 2. Furthermore, a control unit 37 for battery management may be integrated into the hood element 30.

Through the channels 21, which extend over the sides of the middle part 13 as well as the first housing side 10.1 and the second housing side 10.2, a large-area heat exchange can take place between the fluid and the housing interior 2. Furthermore, the battery 4 can be advantageously integrated into the cooling system of the vehicle by the local configuration of the first fluid access point 11 and the second fluid access point 12. Furthermore, the duct system 20 results in advantageous flow characteristics of the fluid. The advantageous flow and heat conduction properties interact in each case with a configuration of the battery 4 that is suitable for production and load, resulting in functional advantages as well as cost advantages for the battery 4.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS

1 Battery housing
2 Housing interior
3 Battery cells
4 Battery
10 Housing unit
10.1 First housing side
10.2 Second housing side
10.3 Mid-level
11 First fluid access point
12 Second fluid access point
13 Middle part
14 First cover element
15 Second cover element
16 Core element
17 Cooling structure
20 Duct system
21 Channels
21.1 Restriction elements
21.2 Angle
21.3 Channel section
22 Guide structure
22.1 Distribution point
23 Kink
24 Drive
30 Hood element
31 First material component base body
32 Second material component
33 Opening
34 Terminal contact
35 Handle unit
36 Vent valve
37 Control unit
101 Provide
102 Produce

The invention claimed is:

1. A battery housing having a housing interior for an arrangement of a plurality of battery cells, and a housing unit which at least partially surrounds the housing interior and has a duct system with a plurality of channels for guiding a fluid for temperature control of the housing interior,
  wherein the housing unit comprises at least a first housing side with a first fluid access point for external access to the duct system,
  wherein,
  the channels extend at least partially along the first housing side in different directions and the duct system comprises a guide structure for a common fluid communication of the channels with the first fluid access point,
  wherein the guide structure is formed by a star-shaped course of more than two restriction elements of the channels, wherein the guide structure has a distribution point at which the more than two restriction elements converge on the first housing side, wherein at least two of the restriction elements at the distribution point form an angle with each other, thereby forming a narrowing channel opening for hydrodynamically directing a fluid flow of the fluid.

2. The battery housing according to claim 1, wherein the housing unit has a middle part which extends from the first housing side and circumferentially surrounds the housing interior, wherein the channels extend along at least one side of the middle part.

3. The battery housing according to claim 2, wherein the housing unit has at least a second housing side with a second fluid access point for external access to the duct system, wherein the middle part is arranged between the first housing side and the second housing side.

4. The battery housing according to claim 3, wherein the housing unit has a geometrical mid-level extending centrally from the first housing side to the second housing side, the first fluid access point and the second fluid access point being arranged on opposite sides of the mid-level.

5. The battery housing according to claim 3, wherein the housing unit comprises at least a first cover element for at least partially covering the channels on the first housing side or a second cover element for at least partially covering the channels on the second housing side.

6. The battery housing according to claim 3, wherein the channels have a kink at least at a transition from the first housing side or the second housing side to the middle part.

7. The battery housing according to claim 3, wherein the housing unit has a hood element for closing the housing interior, the hood element at least partially forming at least the first housing side, the second housing side or the middle part.

8. The battery housing according to claim 7, wherein the housing unit comprises at least a hybrid component or the hood element is configured as a hybrid component, in which a first material component and a second material component are bonded to one another.

9. The battery housing according to claim 8, wherein at least the first material component is a metal and the second material component is a plastic or the first material component forms an inner shell for defining the housing interior and the second material component forms an outer shell for enclosing the inner shell at least in sections.

10. The battery housing according to claim 8, wherein the guide structure at least on the first or second housing side is formed at least partially by the second material component.

11. The battery housing according to claim 8, wherein the first material component of at least the hood element or a core element are of U-shaped configuration.

12. The battery housing according to claim 7, wherein at least the housing unit has a core element, wherein the hood element has an opening in which the core element is at least partially accommodated or the core element at least comprises a metal or is configured as a continuous casting.

13. The battery housing according to claim 12, wherein each of the channels has at least one channel section which is integrated into a wall of the core element.

14. The battery housing according to claim 7, wherein the hood element has at least one terminal contact for external connection to the battery cells, a handle unit for transporting the battery housing or a vent valve for venting the housing interior.

15. The battery housing according to claim 1, wherein a control unit for battery management is integrated into the housing unit.

16. A battery comprising a plurality of battery cells and a battery housing according to claim 1.

17. A method for producing the battery according to claim 16, having the housing unit of the battery housing, which at least partially surrounds the housing interior and has the duct system with the plurality of channels for guiding the fluid for temperature control of the housing interior, comprising:

Providing a base body for defining at least a portion of the housing interior and at least the first housing side of the housing unit, At least partially producing channels of the duct system extending at least partially along the first housing side in different directions, and the guide structure of the duct system for a common fluid communication of the channels with the first fluid access point for external access to the duct system, wherein the at least partial production of the channels and the guide structure is performed on the base body, and Completing the battery by arranging the plurality of battery cells in the housing interior, connecting channel sections of the channels, arranging the first fluid access point on the guide structure, and closing the housing interior.

18. The method of claim 17, wherein at least the base body is formed by a first material component and the guide structure is formed by a second material component, which are connected to one another by material bonding during the production of the guide structure or the base body is covered at least sectionally by the second material component during the production of the guide structure.

\* \* \* \* \*